(12) United States Patent
Tsao

(10) Patent No.: US 8,194,692 B2
(45) Date of Patent: Jun. 5, 2012

(54) APPARATUS WITH AND A METHOD FOR A DYNAMIC INTERFACE PROTOCOL

(75) Inventor: Sheng-Chi Tsao, Taipei Hsien (TW)

(73) Assignee: VIA Technologies, Inc., New Taipei (TW)

( * ) Notice: Subject to any disclaimer, the term of this patent is extended or adjusted under 35 U.S.C. 154(b) by 1725 days.

(21) Appl. No.: 11/285,437

(22) Filed: Nov. 21, 2005

(65) Prior Publication Data

US 2006/0109861 A1     May 25, 2006

Related U.S. Application Data

(60) Provisional application No. 60/630,533, filed on Nov. 22, 2004.

(51) Int. Cl.
    *H04L 12/28* (2006.01)
(52) U.S. Cl. ......... 370/419; 370/319; 370/359; 370/362
(58) Field of Classification Search ............... 370/395.5, 370/252, 325, 419, 319, 359, 362
    See application file for complete search history.

(56) References Cited

U.S. PATENT DOCUMENTS

| | | | | |
|---|---|---|---|---|
| 4,581,645 A * | 4/1986 | Beyers, Jr. | ...................... | 348/705 |
| 4,996,597 A * | 2/1991 | Duffield | ........................ | 348/705 |
| 5,018,013 A * | 5/1991 | Rabii | ............................. | 348/706 |
| 5,572,263 A * | 11/1996 | Kim et al. | ..................... | 348/705 |
| 5,801,782 A * | 9/1998 | Patterson | ....................... | 348/473 |
| 5,838,678 A * | 11/1998 | Davis et al. | .................... | 370/389 |
| 5,986,985 A * | 11/1999 | Kawamura et al. | ......... | 369/44.27 |
| 5,995,709 A * | 11/1999 | Tsuge | ............................... | 386/95 |
| 6,038,400 A * | 3/2000 | Bell et al. | ........................ | 710/11 |
| 6,134,613 A * | 10/2000 | Stephenson et al. | .......... | 710/313 |
| 6,311,014 B1 * | 10/2001 | Nguyen et al. | ................ | 386/125 |
| 6,320,594 B1 * | 11/2001 | Young | ............................. | 345/605 |
| 6,684,026 B2 * | 1/2004 | Kanota et al. | ................. | 386/111 |
| 6,718,443 B2 * | 4/2004 | Yoshida | ......................... | 711/147 |
| 6,745,164 B2 * | 6/2004 | Akita | ............................. | 704/272 |
| 6,757,481 B1 * | 6/2004 | Nazarian et al. | ................ | 386/69 |
| 6,970,482 B2 * | 11/2005 | Kim | ............................... | 370/542 |
| 7,000,039 B2 * | 2/2006 | Ishibashi | ......................... | 710/74 |

(Continued)

FOREIGN PATENT DOCUMENTS

EP        0445532    *   2/1991

OTHER PUBLICATIONS

Micro Linear; ( "CCIR656 NTSC Video Encoder") 1999; Micro Linear; pp. 1-31.*

*Primary Examiner* — Ricky Ngo
*Assistant Examiner* — Dewanda Samuel
(74) *Attorney, Agent, or Firm* — J.C. Patents

(57) ABSTRACT

An apparatus with a dynamic interface protocol and a method for a dynamic interface protocol are provided. The apparatus is capable of consolidating multiple interface protocols to a single output terminal to reduce the number of output pins and the complexity and the cost of the apparatus. The apparatus is characterized by providing an output via the output terminal of the apparatus in accordance with a data protocol in a data mode, and providing the output via the output terminal in accordance with a video protocol in a video mode.

9 Claims, 5 Drawing Sheets

U.S. PATENT DOCUMENTS

| | | | | |
|---|---|---|---|---|
| 7,027,713 B1* | 4/2006 | Hallberg | | 386/68 |
| 7,050,703 B2* | 5/2006 | Ohta et al. | | 386/113 |
| 7,068,324 B2* | 6/2006 | Englert | | 348/589 |
| 7,191,256 B2* | 3/2007 | Adams et al. | | 710/11 |
| 7,352,813 B2* | 4/2008 | Kim | | 375/240.25 |
| 7,362,944 B2* | 4/2008 | Kim | | 386/200 |
| 7,389,366 B2* | 6/2008 | Core | | 710/22 |
| 7,424,150 B2* | 9/2008 | Cooper et al. | | 382/173 |
| 7,774,494 B2* | 8/2010 | Hauke | | 709/237 |
| 2002/0006270 A1* | 1/2002 | Nitta et al. | | 386/95 |
| 2002/0037160 A1* | 3/2002 | Locket et al. | | 386/111 |
| 2003/0048387 A1* | 3/2003 | Sendelweck | | 348/705 |
| 2003/0053798 A1* | 3/2003 | Roshanski et al. | | 386/111 |
| 2003/0093800 A1* | 5/2003 | Demas et al. | | 725/90 |
| 2003/0152368 A1* | 8/2003 | Kitani | | 386/94 |
| 2004/0005145 A1* | 1/2004 | Chen | | 386/116 |
| 2004/0240791 A1* | 12/2004 | Kuo | | 385/53 |
| 2004/0252965 A1* | 12/2004 | Moreno et al. | | 386/46 |
| 2005/0165502 A1* | 7/2005 | Hanes | | 700/94 |
| 2005/0223137 A1* | 10/2005 | Core | | 710/22 |
| 2006/0282699 A1* | 12/2006 | Brondijk et al. | | 714/5 |
| 2007/0030897 A1* | 2/2007 | Ito | | 375/240.12 |
| 2008/0044164 A1* | 2/2008 | Fujinami et al. | | 386/126 |

* cited by examiner

| IDE Pin No. | Data Mode | Video Mode 1 | Video Mode 2 |
|---|---|---|---|
| 1 | IDERESET | | |
| 3 | IDED7 | VDCB9 | VIDEO_PXD[9] |
| 4 | IDED8 | VDCR2 | VIDEO_PXD[8] |
| 5 | IDED6 | VDCB8 | VIDEO_PXD[7] |
| 6 | IDED9 | VDCR3 | VIDEO_PXD[6] |
| 7 | IDED5 | VDCB7 | VIDEO_PXD[5] |
| 8 | IDED10 | VDCR4 | VIDEO_PXD[4] |
| 9 | IDED4 | VDCB6 | VIDEO_PXD[3] |
| 10 | IDED11 | VDCR5 | VIDEO_PXD[2] |
| 11 | IDED3 | VDCB5 | VIDEO_PXD[1] |
| 12 | IDED12 | VDCR6 | VIDEO_PXD[0] |
| 13 | IDED2 | VDCB4 | |
| 14 | IDED13 | VDCR7 | |
| 15 | IDED1 | VDCB3 | |
| 16 | IDED14 | VDCR8 | |
| 17 | IDED0 | VDCB2 | |
| 18 | IDED15 | VDCR9 | |
| 23 | IDEDIOW | VDY2 | |
| 25 | IDEDIOR | VDY3 | |
| 27 | IDEIORDY | VSYNC | |
| 31 | IDEINTTRQ | VDY4 | |
| 33 | IDEDA1 | VIDEO_REQ | |
| 34 | IDEPDIAG_ | VDY9 | |
| 35 | IDEDA0 | VDY5 | |
| 36 | IDEDA2 | VDY6 | |
| 37 | IDECS0 | VDY7 | |
| 38 | IDECS1 | VDY8 | |
| 39 | IDEDASP_ | VCLK | PXD_CLK |

FIG. 4

| Signal | Description |
|---|---|
| VDY2~VDY9 | Video data Y bits 2 to 9 |
| VDCB2~VDCB9 | Video data CB bits 2 to 9 |
| VDCR2~VDCR9 | Video data CR bits 2 to 9 |
| VSYNC | Vertical synchronization |
| VIDEO_REQ | Video data ready |
| VCLK | Video data clock |

FIG. 5

APPARATUS WITH AND A METHOD FOR A DYNAMIC INTERFACE PROTOCOL

CROSS-REFERENCE TO RELATED APPLICATION

This application claims the priority benefits of U.S. provisional application titled "DVD APPARATUS AND OPERATION" filed on Nov. 22, 2004, Ser. No. 60/630,533. All disclosure of this application is incorporated herein by reference.

BACKGROUND OF THE INVENTION

1. Field of the Invention

The present invention relates to an apparatus and a method for a dynamic interface protocol. More particularly, the present invention relates to an apparatus and a method for a dynamic interface protocol, which provides output via an output terminal in accordance with different interface protocols in different operating modes.

2. Description of the Related Art

In modern digital systems, there are integrated circuits (IC) that have to provide outputs in accordance with different interface protocols in different operating modes. For example, an IC in a digital system may provide data, such as an MPEG (motion picture expert group) bit stream, received from a DVD servo directly as output in accordance with the IDE (integrated drive electronics) protocol in an operating mode. Additionally, the IC may provide video signals obtained from decoding the data in accordance with the CCIR656 standard proposed by ITU (International Telecommunication Union) in another operating mode.

In conventional systems, due to differences among interface protocols, integrated circuits provide output via different output terminals during different operating modes. Basically, those operating modes do not activate simultaneously in most cases, that is, an IC is usually in a single operating mode at a time. Since multiple output terminals increase the number of output pins, the complexity and the cost of such integrated circuits, it is desirable to have an apparatus to consolidate multiple interface protocols to a single output terminal.

SUMMARY OF THE INVENTION

Accordingly, the present invention is directed to an apparatus with a dynamic interface protocol. The apparatus is capable of consolidating multiple interface protocols to a single output terminal so as to reduce the number of output pins and the complexity and cost of the apparatus.

The present invention is also directed to a method for a dynamic interface protocol. The method is capable of consolidating multiple interface protocols to a single output terminal so as to reduce the number of output pins and to enhance the flexibility of applications of the apparatus to which the output terminal belongs.

According to an embodiment of the present invention, an apparatus with a dynamic interface protocol is provided. The apparatus is characterized by providing an output via an output terminal of the apparatus in accordance with a data protocol in a data mode, and providing the output via the same output terminal in accordance with a video protocol in a video mode.

In an embodiment of the present invention, the apparatus further comprises a video decoder and a video output interface. The video decoder is coupled to an input terminal of the apparatus, receives and decodes a video signal into a decoded video signal, and provides the decoded video signal. The video output interface is coupled between the video decoder and the output terminal, converts the decoded video signal into a converted video signal in accordance with the video protocol, and provides the converted video signal.

In an embodiment of the present invention, the apparatus further comprises a first switching device and a second switching device. The first switching device is coupled between the input terminal and the video decoder. The second switching device is coupled among the first switching device, the video output interface and the output terminal. The first switching device directs the video signal to the video decoder in the video mode, and directs a data signal to the second switching device in the data mode. The second switching device directs the converted video signal to the output terminal in the video mode, and directs the data signal to the output terminal in the data mode.

In an embodiment of the present invention, the data protocol conforms to IDE.

In an embodiment of the present invention, the video protocol conforms to CCIR656.

In an embodiment of the present invention, the apparatus has a plurality of video modes, and each of the video modes corresponds to a different video protocol.

According to another embodiment of the present invention, a method for a dynamic interface protocol is provided. The method is characterized by providing an output via an output terminal in accordance with a data protocol in a data mode, and providing the output via the output terminal in accordance with a video protocol in a video mode.

In an embodiment of the present invention, the method further comprises the steps of receiving and decoding a video signal into a decoded video signal, and converting the decoded video signal into a converted video signal in accordance with the video protocol and providing the converted video signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a table showing the usage of the output pins in the operating modes of the apparatus in FIG. 1 according to an embodiment of the present invention.

FIG. 5 is a table explaining the signals of a proprietary protocol according to an embodiment of the present invention.

DESCRIPTION OF THE EMBODIMENTS

Figure 1:
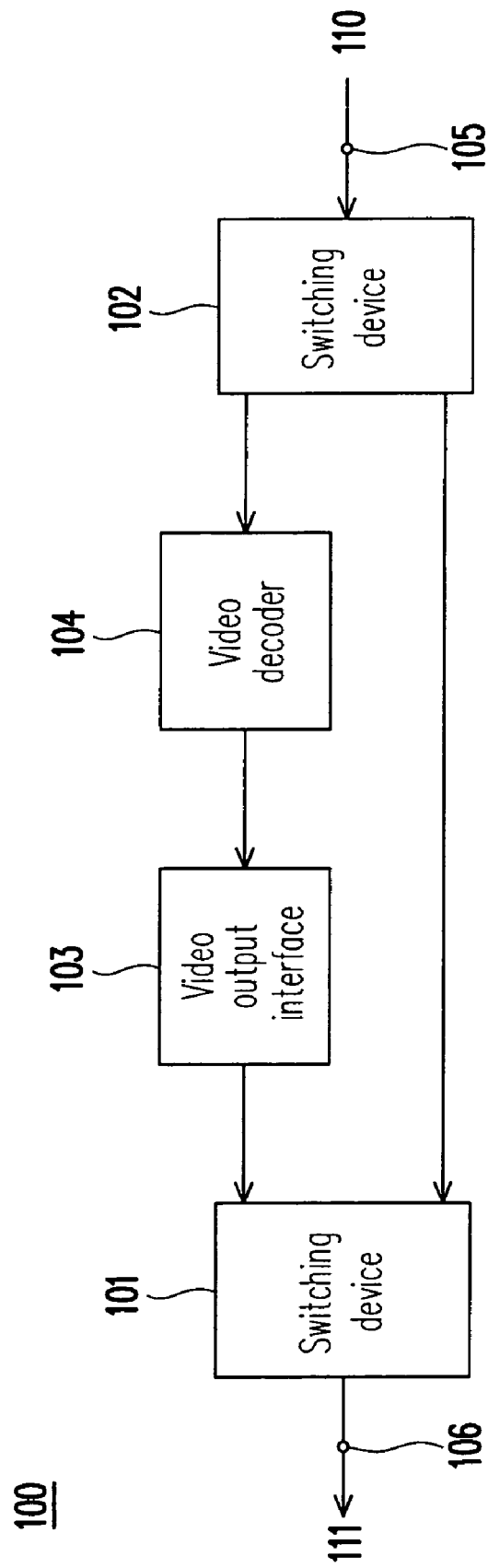
FIG. 1 is a schematic diagram showing an apparatus with a dynamic interface protocol according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Please refer to FIG. 1. FIG. 1 is a schematic diagram showing the apparatus 100 with a dynamic interface protocol according to an embodiment of the present invention. In this embodiment, the apparatus 100 is used in a home DVD (digital versatile disc) player, a desktop computer or a notebook computer. The input 110 of the apparatus 100 is an MPEG bit stream from a DVD servo.

The apparatus 100 has multiple operating modes that are a data mode and a plurality of video modes. In the data mode, the apparatus 100 provides its output 111 in accordance with a data protocol, such as IDE in this embodiment, via the output terminal 106. The output 111 is provided to an IDE device in the data mode. In one of the video modes, the apparatus 100 provides its output 111 obtained from decoding the MPEG bit stream 110 in accordance with a video protocol, such as CCIR656 proposed by ITU, via the same output terminal 106. In this embodiment, the output 111 is provided to a TV encoder or a video data processor in one of the video modes.

In the scope of the present invention, the data protocol is not limited to IDE. The data protocol can be any interface protocol suitable for transmitting binary data. Also in the scope of the present invention, the apparatus 100 has at least one video mode, wherein each video mode corresponds to a different video protocol.

Figure 2:
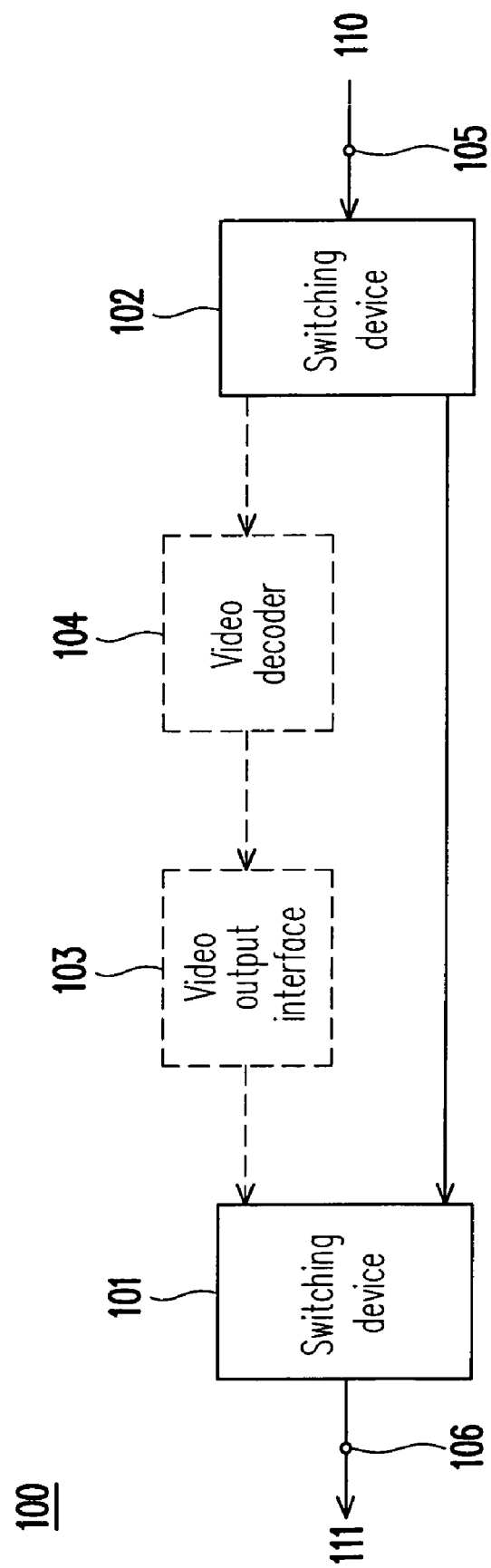
FIG. 2 is a schematic diagram showing the data flow of the apparatus in FIG. 1 in the data mode according to an embodiment of the present invention.

The apparatus 100 comprises the video decoder 104, the video output interface 103, and the switching devices 101 and 102. The data flow of the apparatus 100 in the data mode is shown in solid lines in FIG. 2. In the data mode, the switching device 102 receives a data signal, which is the data bit stream 110 in this embodiment, from the input terminal 105 and directs the data signal to the switching device IO. The switching device 101 directs the data signal to the output terminal 106.

Figure 3:
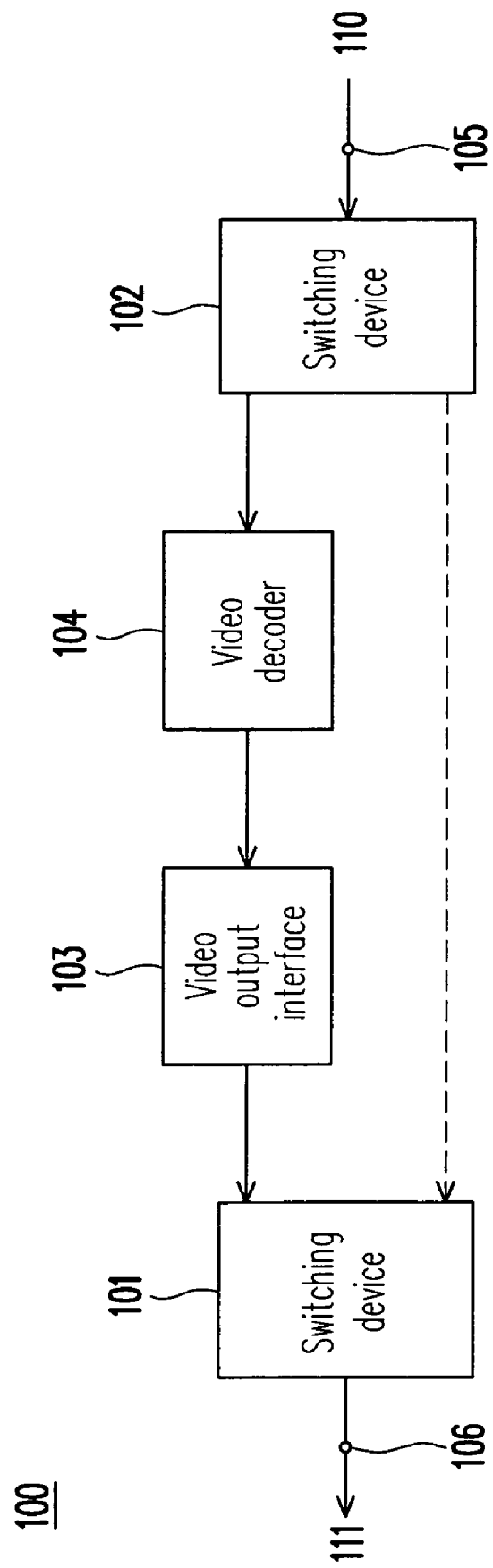
FIG. 3 is a schematic diagram showing the data flow of the apparatus in FIG. 1 in the video mode according to an embodiment of the present invention.

On the other hand, the data flow of the apparatus 100 in any one of the video modes is shown in solid lines in FIG. 3. In one of the video modes, the switching device 102 receives a video signal, which is the MPEG bit stream 110 in this embodiment, from the input terminal 105 and directs the video signal to the video decoder 104. The video decoder 104 receives and decodes the video signal into a decoded video signal, and provides the decoded video signal to the video output interface 103. The video output interface 103 converts the decoded video signal into a converted video signal in accordance with the video protocol, and outputs the converted video signal. Finally, the switching device 101 directs the converted video signal to the output terminal 106.

Since the apparatus 100 use the same output terminal 106 no matter in the data mode or in one of the video modes, only a single bus is needed for various protocol exchanges. Moreover, the video decoder 104 and the video output interface 103 of the apparatus 100 can be programmed to support proprietary video protocols and their corresponding video modes. In this way, the apparatus 100 is capable of providing advanced data formats for various applications, such as multi-channel audio, progressive video and high-definition video.

In this embodiment, the pins of the output terminal 106 are shared by the interface protocols of the operating modes. FIG. 4 is a table showing the usage of the pins of the output terminal 106 in the operating modes of the apparatus 100. In this embodiment, the apparatus 100 has a data mode and two video modes. The pins carry the standard IDE signals in the data mode, and carry the standard CCIR656 signals in video mode 2. The interface protocol used in video mode 1 is a proprietary video protocol. The signals of the proprietary protocol are explained in the table in FIG. 5.

The proprietary protocol in video mode 1 uses the Y-CB-CR domain to describe colors instead of the RGB domain, wherein Y stands for illuminance, CB and CR stand for color difference. Each of the Y, CB and CR components of a color is quantized into 8 bits (data bits 2 to 9). Since there are enough output pins, the complete color information is provided in the proprietary video protocol.

In this embodiment, the pins of the output terminal 106 are shared by the protocols. However, in the scope of the present invention, if there are enough output pins, it is possible that the interface protocols do not share pins at all. That is, each interface protocol occupies an individual set of pins, and the sets do not overlap.

As can be seen in the discussions above, the apparatus 100 in this embodiment provides output via the output terminal 106 no matter in the data mode or in one of the video modes. Therefore the apparatus 100 is capable of consolidating various interface protocols to a single output terminal. A single bus is enough for various protocol exchanges. In this way, the pin count of the apparatus 100 is lower than that of its conventional counterparts. For example, consider the embodiment shown in FIG. 4. The IDE protocol needs 40 pins and the proprietary protocol needs 27 pins. By sharing output pins, the apparatus 100 reduces the pin count from 67 to 40. Consequently, the complexity and the cost of the apparatus 100 are also reduced. And the apparatus 100 has higher application flexibility than that of its conventional counterparts.

In additional to the apparatus 100 with a dynamic interface protocol according to the previous embodiment of the present invention, the present invention also comprehends a method for a dynamic interface protocol. For one skilled in the related art of the present invention, it is easy to realize the method according to the operation of the apparatus 100 in the previous embodiment of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus with a dynamic interface protocol, comprising:
   an input terminal;
   an output terminal;
   a first switching device coupled to the input terminal; and
   a second switching device coupled between the first switching device and the output terminal, wherein the apparatus provides an output via the output terminal in accordance with a data protocol in a data mode, and provides the output via the output terminal in accordance with a video protocol in a video mode, the output terminal comprises a plurality of pins, at least one of the pins is shared by the data protocol and the video protocol, only one of the data protocol and the video protocol controls the output terminal at any moment,
   in the data mode, the first switching device receives a data bit stream from the input terminal and transmits the data bit stream directly to the second switching device without any processing, the second switching device transmits the data bit stream directly to the output terminal without any processing.

2. The apparatus according to claim 1, further comprising:
- a video decoder, coupled to the first switching device, receiving and decoding a video signal into a decoded video signal, and providing the decoded video signal; and
- a video output interface, coupled between the video decoder and the second switching device, converting the decoded video signal into a converted video signal in accordance with the video protocol, and providing the converted video signal.

3. The apparatus according to claim 2, wherein the first switching device directs the video signal from the input terminal to the video decoder in the video mode, and the second switching device directs the converted video signal to the output terminal in the video mode.

4. The apparatus according to claim 1, wherein the apparatus has a plurality of video modes, and each of the video modes corresponds to a different video protocol.

5. A method for a dynamic interface protocol, comprising:
- providing an output via an output terminal in accordance with a data protocol in a data mode, and providing the output via the output terminal in accordance with a video protocol in a video mode, wherein the output terminal comprises a plurality of pins, at least one of the pins is shared by the data protocol and the video protocol, only one of the data protocol and the video protocol controls the output terminal at any moment; and
- transmitting a data bit stream from an input terminal through a first switching device and a second switching device to the output terminal directly without any processing in the data mode.

6. The method according to claim 5, wherein in the video mode further comprising the steps of:
- receiving and decoding a video signal into a decoded video signal; and
- converting the decoded video signal into a converted video signal in accordance with the video protocol, and providing the converted video signal.

7. The method according to claim 5, wherein there is a plurality of video modes and each of the video modes corresponds to a different video protocol.

8. An apparatus with a dynamic interface protocol, comprising:
- an input terminal;
- an output terminal;
- a first switching device coupled to the input terminal; and
- a second switching device coupled between the first switching device and the output terminal, wherein the apparatus provides an output via the output terminal in accordance with a data protocol in a data mode, and provides the output via the output terminal in accordance with a video protocol in a video mode, the output terminal comprises a plurality of pins, and the pins used by the data protocol and the pins used by the video protocol do not overlap,
- in the data mode, the first switching device receives a data bit stream from the input terminal and transmits the data bit stream directly to the second switching device without any processing, the second switching device transmits the data bit stream directly to the output terminal without any processing.

9. A method for a dynamic interface protocol, comprising:
- providing an output via an output terminal in accordance with a data protocol in a data mode, and providing the output via the output terminal in accordance with a video protocol in a video mode, wherein the output terminal comprises a plurality of pins, and the pins used by the data protocol and the pins used by the video protocol do not overlap; and
- transmitting a data bit stream from an input terminal through a first switching device and a second switching device to the output terminal directly without any processing in the data mode.

* * * * *